Nov. 3, 1936.    F. C. KNISS    2,059,798

STUFFING BOX

Filed Sept. 24, 1934

Inventor
F. C. Kniss.
By Lacey & Lacey,
Attorney

Patented Nov. 3, 1936

2,059,798

UNITED STATES PATENT OFFICE 2,059,798

STUFFING BOX

Frank C. Kniss, El Dorado, Ark.

Application September 24, 1934, Serial No. 745,327

1 Claim. (Cl. 286—16)

This invention relates to stuffing boxes for deep well pumps, and has for its object the provision of packing which may be very easily repaired or renewed without requiring the use of many special tools or highly skilled labor. It is also an object of the invention to provide packing of such form that waste of packing will be minimized and efficient contact between the packing and the polish rod will be easily maintained.

These objects and other objects which will appear incidentally in the course of the following description are attained in such a structure as is illustrated in the accompanying drawing and the invention resides in certain novel features which will be particularly defined in the appended claims.

Figure 1:
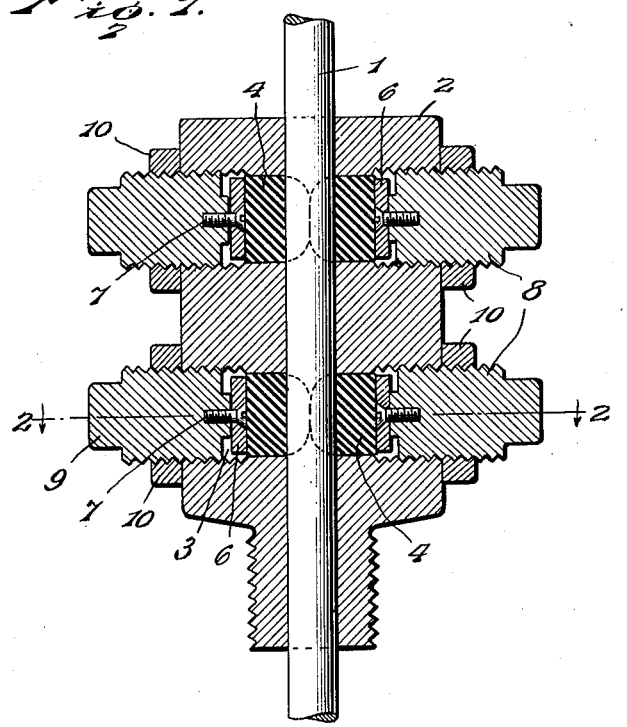
Figure 1 is a vertical section through a stuffing box having the invention applied thereto.
Figure 2:
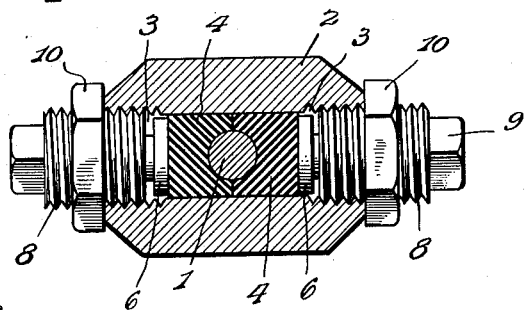
Figure 2 is a horizontal section on the line 2—2 of Figure 1.
Figure 3:
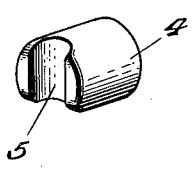
Figure 3 is a detail perspective view of the packing.

In the drawing, the reference numeral 1 indicates the polish rod and 2 designates the stuffing box having a central bore which accommodates the polish rod, and provided with a plurality of radial bores 3 leading from said central bore. The radial or lateral bores are circular in cross section and preferably are disposed in pairs arranged one pair above the other pair with the members of each pair in axial alinement. The inner end portions of the radial bores are smooth, as clearly shown in Figures 1 and 2, while the outer portions thereof are threaded. The packing is in the form of a plug 4 of rubber or other suitable material having a circular cross section whereby it may fit easily and snugly within the inner end portion of the bore 3. The inner end of the plug is formed with a diametrical groove or notch 5 having an arcuate cross section whereby it may fit closely to and around the polish rod, as shown in Figure 3. The outer end of the packing plug is smooth and plane so that it may fit squarely against a follower disc 6 of circular outline whereby the follower may enter the smooth end portion of the lateral bore and bear flatly against the outer end of the packing plug. The follower disc may be of any preferred metal and is provided with a central opening through which a countersunk screw 7 is inserted, the head of the screw and a portion of its shank being smooth so that the follower will be swiveled thereon. The screw is engaged in a threaded socket provided therefor in the inner end of a securing plug 8 which is externally threaded so that it may be engaged with the threaded end of the lateral bore, and the outer end of the plug is provided with a terminal 9 of non-circular cross section whereby it may be easily engaged by a wrench or other turning tool. A lock nut 10 is mounted upon the plug 8 and turned home against the side of the stuffing box, as shown in the drawing whereby the securing plug will be secured in its set position to hold the packing plug in engagement with the polish rod.

From the foregoing description, taken in connection with the accompanying drawing, it will be seen that I have provided a very simple packing which may be adjusted to maintain the proper contact with the polish rod and which will effectually prevent leakage. As the plug 4 wears, the securing plug may be adjusted inwardly in the stuffing box so as to compensate for wear, and when the plug has been moved inwardly to the limit of its travel which will be determined by the end of the screw threads in the bore, the plug may be withdrawn and a second packing plug may be inserted to bear against the outer end of the original packing plug whereupon the securing plug with the swiveled follower disc may be again inserted in the bore and turned home to secure the parts in operative position. The lock nut mounted upon the securing plug will effectually resist loosening of the plug but may be easily loosened to permit adjustment of the plug as the packing wears. The first packing plug will be shaped or provided with the groove 5 which, of course, is disposed vertically when the plug is inserted in the box but subsequent packing plugs need not be preformed inasmuch as the reciprocation of the polish rod across the end of the plug will, naturally, wear a vertical groove therein. The swivel mounting of the follower disc will avoid turning of said disc with the securing plug so that twisting of the packing plug will not be apt to occur and, consequently, the wear upon the packing plug will be even and the plug will be useful until it is entirely worn out, at which time the second plug will have been adjusted inwardly so as to make contact with the polish rod and there will be no loss of efficiency in the packing. It will be readily understood that it is not necessary to remove the worn packing as the second or new plug may be inserted so as to bear against the outer end of the first plug and thereby save time in repacking, as well as utilizing every particle of the packing. The circular shape of the packing plug causes the side portions of the same to fit around the polish rod while the top and bottom of the plug make minimum contact with the rod and the abutting area is much less than in the generally employed forms of packing so less tension upon the packing is needed. The form of the several parts is such that they may be used interchangeably thereby reducing the cost of production and of maintenance. Inasmuch as the opening in the box and the parts engaged in the opening are of circular contour, they may be fitted together so as to renew or adjust the packing easily in the very poor light which generally is found at deep wells.

Having thus described the invention, what is claimed as new is:

A stuffing box for deep wells comprising a vertically elongated metal body having a central bore to receive a polish rod and lateral bores of circular cross section leading radially from the central bore in diametrically opposed relation to each other, the lateral bores having smooth inner end portions and threaded outer end portions, solid rubber packing plugs of circular cross section fitted closely in the unthreaded inner end portions of the lateral bores, threaded securing plugs screwed into the threaded outer end portions of the lateral bores, said plugs presenting at their inner ends a relatively small concaved surface to the polish rod whereby wear will be materially reduced, follower discs swiveled upon the inner ends of the securing plugs and bearing against outer ends of the packing plugs and adapted to enter the inner end portions of the lateral bores as the packing plugs wear, the outer ends of the securing plugs being adapted to be engaged by a turning tool, and lock nuts mounted on the securing plugs and turned home against side faces of the body.

FRANK C. KNISS.